United States Patent [19]
Jofs

[11] Patent Number: 4,488,918
[45] Date of Patent: Dec. 18, 1984

[54] NON-SLIP PLASTIC FILM

[75] Inventor: Jarl-Erik Jofs, Vaasa, Finland

[73] Assignee: Oy Wiik & Hoglund AB, Vaasa, Finland

[21] Appl. No.: 498,788

[22] Filed: May 27, 1983

Related U.S. Application Data

[63] Continuation of Ser. No. 296,791, Aug. 27, 1981, abandoned.

[30] Foreign Application Priority Data

Apr. 21, 1981 [CA] Canada .................................. 375869

[51] Int. Cl.³ .............................................. B32B 5/18
[52] U.S. Cl. .................................. 156/79; 156/244.24; 156/267; 156/272.2; 264/45.1; 264/46.1; 264/210.1; 428/141; 428/172

[58] Field of Search ....................... 428/141, 156, 172; 156/79, 244.24, 244.25, 267, 272.2, 285; 264/45.1, 45.3, 46.1, 177 R, 210.1, 241

[56] References Cited

U.S. PATENT DOCUMENTS

| 3,159,698 | 12/1964 | Suh et al. | 156/224 |
| 3,582,418 | 6/1971 | Schuur | 156/244.24 |
| 3,682,730 | 8/1972 | Haase | 156/79 |
| 4,045,270 | 8/1977 | Jofs | 156/79 |

Primary Examiner—Paul J. Thibodeau
Attorney, Agent, or Firm—Zarley, McKee, Thomte, Voorhees & Sease

[57] ABSTRACT

This invention discloses a plastic film having a non-slip surface comprising spaced random patterns of rigid peaks and ridges formed by a second thermo-plastic layer coextruded with and bonded to the plastic film and rupturing the second layer during expansion.

19 Claims, 7 Drawing Figures

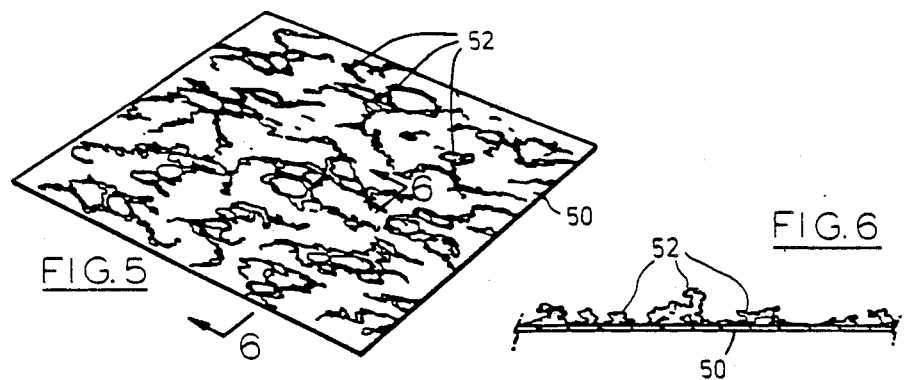
FIG. 5
FIG. 6
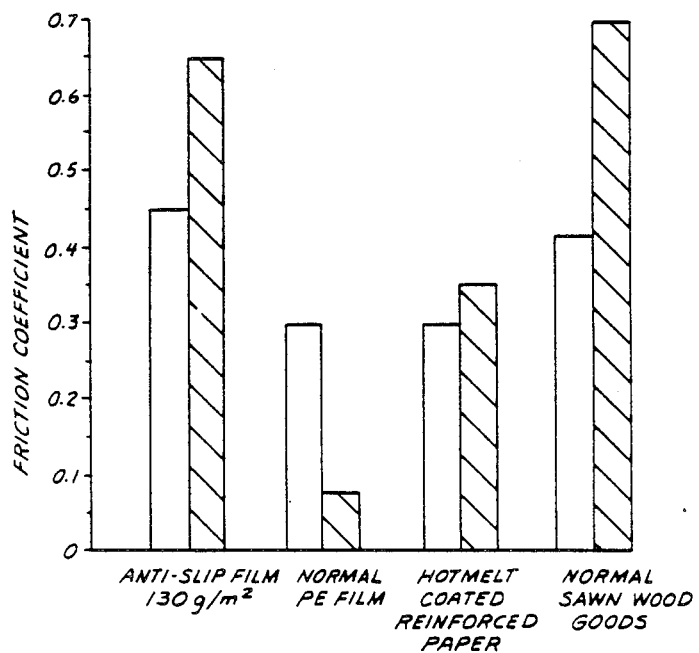
FIG. 7

NON-SLIP PLASTIC FILM

This is a continuation of application Ser. No. 296,791, filed Aug. 27, 1981, now abandoned.

This invention relates to an improved form of non-slip plastic film and the method of making same.

Plastic films such as polyethylene are at present commonly used for making various types of packaging and wrapping or bags containing finely divided or powdered material such as fertilizer, grain and cement. They are also used for covering concrete, wrapping timber, and for packaging frozen food products. These uses of plastic films have the disadvantage that they present a smooth, glossy surface with a very low coefficient of friction and as a result tend to be slippery to step on, especially outdoors where they may be covered with frost or snow and ice and water. Furthermore, bags of material such as fertilizer, grain, cement etc. are often difficult to deal with when they have to be piled in box cars because their slippery surfaces tend to cause the piles of bags to collapse and create chaos and endanger workers. This is especially true when the bags are made more slippery by a layer of dust or powder. Similarly, frozen food packages such as cartons of ice cream, pizza etc. and frozen lamb carcasses, which are often transported in heatshrinkable covers, tend to be slippery and unmanageable during transportation and storage.

Attempts have already been made to eliminate some of these disadvantages by producing a bag or wrapping of plastic film having a surface intended to provide a texture to minimize the slipperiness. However, attempts to emboss the plastic with a pattern or to glue patches of non-slip material on it have proved costly, difficult to produce and ineffective.

More recently, attempts have been made to produce a desirable product by extruding on the surface of a plastic film a plastic foam designed to provide a tacky surface of an irregular profile. Such an attempt is described in U.S. Pat. No. 3,553,070 to Arnold F. Sparks in which it is pointed out that a tacky surface on the plastic film is not alone sufficient to overcome slipperiness since the tackiness is often destroyed by a coating of powder (in the case of fertilizer, starch or flour and other finely divided products often packaged in plastic bags). It was the object of the Sparks invention to provide a plastic film with an outer layer of foamed plastic whereby the open network of foam cells would provide craters for dust particles, preventing them from adhering to the total surface of the film. This leaves other portions of the undulating surface of the plastic bag to remain in tacky contact with adjacent bags.

However, it has been the experience of this inventor that aside from the problems created by dust and powders, non-slippery plastic films are of great use in the outdoors on construction sites, for covering concrete, and for wrapping lumber. It is important for such applications that they be rendered non-slippery to avoid danger to workmen when the plastic is exposed to snow and ice and water. In fact, labour codes in some countries require protection against this hazard.

Similarly, frozen foods such as ice cream and prepared meals such as pizza and T.V. dinners and meat such as lamb carcasses are often wrapped in plastic and kept in freezer storage. Such uses encounter the problems presented by frost, water and ice which tend to make plastic films very slippery and which, by their nature, tend to nullify the tackiness on which material such as the Sparks patent invention relies. In these respects, an outer foam layer on a plastic film is found to be too smooth and the tackiness is ineffective, especially affecting friction between a layer of plastic film and a workman's boot or a layer of ice.

I have found that a greater degree of resistance to slipping can be achieved by a film which has upon its surface a pattern of relatively high, sharp, irregular plastic peaks and ridges, sufficiently sharp, pronounced, hard and rough to effect a mechanical gripping with other like surfaces or with material with which it comes in contact such as the sole of a workman's boot or even snow and frost deposits.

Furthermore, I have found that such a non-slippery surface may be created by co-extruding with a plastic film an outer coating of polymer mixed with sufficient gas or particulate inclusions so as to cause voids or cavities in the polymer which cause it to rupture and break apart during the stretching of the plastic film in the manufacturing process, thus forming scattered ridges and peaks of the polymer on the continuous plastic film.

I have found that such a texture can be obtained by co-extruding on a plastic film, a second polymer having a lower melt index (high viscosity) and/or higher density or hardness. The rupturing of the second layer may be encouraged by the inclusion of particles or gas bubbles such as Freon.

Methods of co-extrusion are described in the aforementioned U.S. Pat. No. 3,553,070 to Sparks and U.S. Pat. No. 4,045,270 to the present inventor, wherein currently known methods for extruding a tube of plastic and then expanding it by internal air pressure to form a film have been adapted by co-extrusion to produce a layered or laminated film product. I have found by using known co-extrusion methods with improvements thereon, that films such as described above can be cheaply and effectively made by employing in the outer coating a thermoplastic having a relatively high viscosity, and high elasticity in the plastic-elastic state, and high density. Such a viscous, high hardness plastic has a desired effect and an inexpensive and convenient material which creates voids such as Freon gas or powdered fillers may be used to create pores or interruptions in the plastic thus decreasing its melt strength as a layer and to aid the rupture of the second layer and aid in the forming of the sharp peaks and ridges.

Furthermore, I have found that a more effective production results if the dies for co-extrusion are modified so that the parallel path of the film and the coating converge before leaving the end of the orifice so that the two streams of plastic are sufficiently welded together before leaving the extrusion die and before the plastic material is expanded and stretched by internal air pressure.

The nature of this improved product and the method and apparatus by which it is produced can be better understood by the following description of a typical embodiment with reference to the drawings in which:

FIG. 5 is an artist's rendition illustrating the appearance and texture of the product produced in accordance with the present invention;

FIG. 6 is a cross section illustrating the profile of a product produced in accordance with this invention as illustrated in FIG. 5; and FIG. 7 is a graphic illustration of comparison tests on the effectiveness of non-slip film of the present invention.

Figure 1:
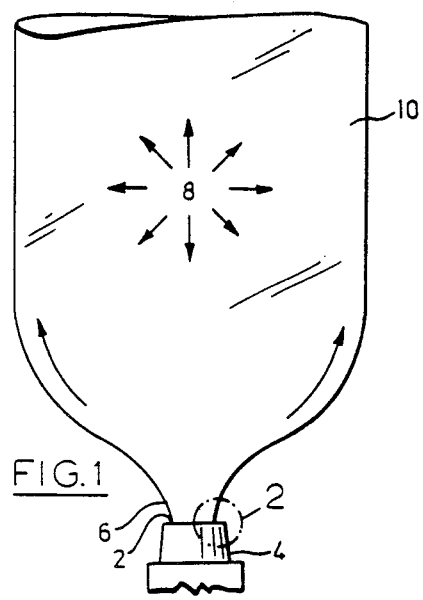
FIG. 1 illustrates a typical known method of producing a plastic film.

In a typical known method of producing plastic film, as illustrated in FIG. 1, the nozzle 2 of the extrusion die 4 has an annular opening which produces upon extrusion a cylindrical plastic tube 6 emerging in a vertical upward direction. At the same time, the emerging tube is subjected to elevated internal air pressure in the region 8 which causes the plastic tube to inflate or expand, thus stretching the plastic tube 6 to form a plastic envelope 10 which is capable of being used to fabricate plastic bags or bulk quantities of plastic film. The plastic is in fact stretched biaxially, the longitudinal stretching being caused by the speed of the rolls which pull the film off. The method is known to those skilled in the art.

Figure 2:
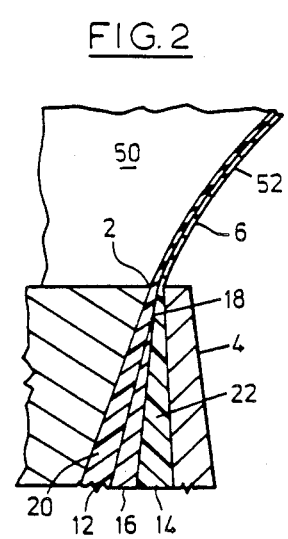
FIG. 2 illustrates in detail a cross section of the extrusion die used in the method of FIG. 1, modified for the present invention.

FIG. 2 illustrates an adaptation of the apparatus and method shown in a general way in FIG. 1. The cross section illustrates a portion of the annular nozzle 2 from which the plastic tube emerges. However, in the arrangement of FIG. 2, the die is constructed with two channels 12 and 14 respectively leading towards the nozzle 2 but initially separated by an island 16. This configuration allows for the coextrusion of two streams of plastic material simultaneously and coincidentally.

As illustrated in FIG. 2, the island 16 narrows towards the nozzle and terminates at a point 18 a short distance upstream from the nozzle outlet 2 thereby allowing the two streams of plastic 20 and 22 respectively to merge and flow together along the remaining combined channel until they emerge from the nozzle 2. In the extrusion process this has the effect of forcing the two streams of plastic together forming a stronger weld or bond between the streams of plastic during their passage through the confined region of the die between the tip of the island 16 and the orifice 2 where the plastic emerges. This feature has a beneficial effect which will be described hereinafter.

I have found that an improved non-slip film may be produced by the method and apparatus illustrated in FIGS. 1 and 2, which has more effective utility in outdoor conditions and the presence of snow, ice, frost or water as previously described. I have found that a plastic film which incorporates a relatively rigid, high profile, random pattern of hard, sharp peaks and ridges serves better in conditions of frost and ice and snow and water than an exposed layer of foam having open cells or craters. It is believed that this texture provides a mechanical gripping between the plastic material and any adjacent surfaces, whether it be workmen's boots or the floor of a box car or another package of similarly wrapped goods, or even a layer of snow. The sharp ridged peaks and ridges seem to effect a mechanical interlocking like the meshing of gear teeth and it has been found that the presence of snow can actually increase the coefficient of friction by packing and forming around the peaks and ridges. Actual tests in accordance with the procedures of the State Institute for Technical Research in Finland showed the coefficient of friction for a film made in accordance with the present invention was between 2 and 6 times the coefficient for normal smooth polyethylene film. Examples of such comparison results are illustrated in FIG. 7.

Figure 3:
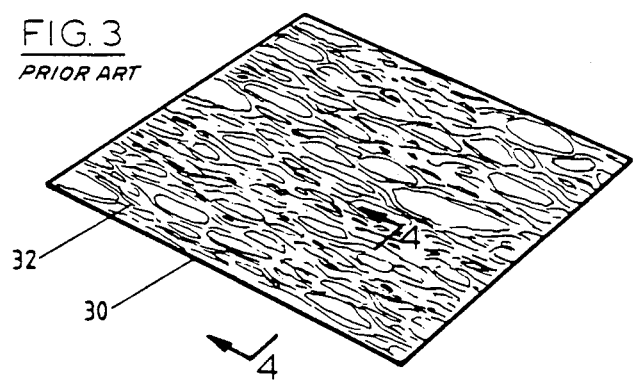
FIG. 3 is an artist's rendition illustrating the appearance and texture of the product produced by previous methods.
Figure 4:
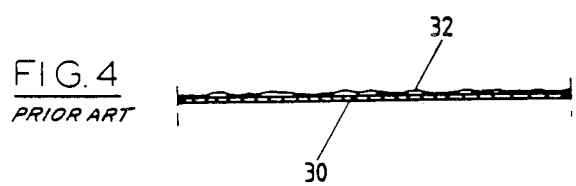
FIG. 4 is a cross-sectional illustration of the profile of the product illustrated in FIG. 3.

For purposes of comparison, FIGS. 3 and 4 illustrate, as well as can be done by drawings taken from actual photographs, the appearance and profile of a plastic film intended to be rendered non-slip by the production process of the prior art. The base layer of film 30 has upon it an undulating layer provided by the coextruded foam layer 32 on the underlying film 30.

By comparison, FIGS. 5 and 6 illustrate graphically an actual photograph of the appearance and profile of a non-slip film made in accordance with the present invention in which the base film 50 has upon it a pattern of random spaced, upstanding, sharp ridges and peaks 52, having a hard rough texture vaguely similar to sandpaper or rough sawn wood though less uniform in nature and of entirely different construction and function.

The following table illustrates the relative proportions of the film thickness and the height of the peaks and ridges taken from an actual product of the present invention.

| BASE LAYER FILM THICKNESS | HEIGHT OF PEAKS |
| --- | --- |
| 0.06 mm | 0.60–0.80 mm |
| 0.20 mm | 0.70–1.00 mm |
| 0.05 mm | 0.20–0.40 mm |

The illustrated peaks and ridges, it is theorized, effective by virtue of the fact that they are stiff, or rigid, sharp peaks tend to press into soft material or project into the crevices of rough material adjacent to it to effect a type of mechanical gripping as opposed to a tacky sticking as described in Sparks. Furthermore, if two similar surfaces of this nature are placed against each other, as they might be in the case of a stack of plastic bags, similar ridges and peaks on the opposing surfaces will tend to abut each other and interlock, somewhat in the way gears intermesh, or as a kind of thistle-effect, preventing the bags from slipping relative to each other.

While the structure described above can be, and is believed preferably made by co-extrusion of a uniform typical plastic film with another plastic substance designed to create the rough textured peaks and ridges on the outer sides, I have found that certain modifications in this known technique of co-extrusion produce an unexpectedly effective result in achieving the type of profile and texture described for the purposes of the object of this invention.

To produce the desired result, a conventional plastic film such as low density polyethlyene can be extruded through one channel such as 12 of an orifice illustrated in FIG. 2, while a second plastic material is extruded through the second channel 14, which material is designed to create the non-slip texture on the surface as described and illustrated in FIGS. 5 and 6. I find it preferable to modify the die as illustrated in FIG. 2 so that the island 16 terminates a short distance upstream from the outlet 2 of the orifice, thereby allowing the two streams to merge and become welded together with a sufficient bond prior to emergence from the orifice. As a result, when the thermoplastic film 50 is then stretched on emerging from the die, the bonded second layer 52 will remain bonded to it and be forced to stretch with it.

In the process, which I have found particularly suitable for the objects of the present invention, the second stream of plastic material (i.e. 22) comprises a relatively hard, high density thermoplastic having a considerable rigidity at normal ambient atmospheric conditions whether it be room temperature or below the freezing temperature of water (especially if the film is to be used in connection with heavy loads with high surface pressure, although a softer thermoplastic with lower density may be used if the load is lighter), but which has a high viscosity (compared to the normal polyethylene of the base film) at the forming temperature, that is the temperature at which the film is expanded on emerging from the die, which is often referred to as the plastic-elastic state. The vast variety of plastics and combinations of properties make it impossible to define exhaustively and precisely which materials will satisfy the present invention, but those skilled in the art will be able to select appropriate materials for the purposes of this invention. Stated in other terms, it is my experience that a material for the second layer having a relatively low melt flow index, and therefore a relatively higher viscosity in the plastic or plastic-elastic state is more effective to produce the product of the present invention.

In addition, I find it advantageous for this method to impregnate the second stream of material with a high proportion of inclusions such as gas bubbles or powdered particles which serve to provide interruptions in the fabric or matrix of the second stream so as to aid in its tendency to rupture on stretching. For this purpose gas bubbles may be produced by injection in the extrusion machinery as pressurized gas or may be effected by blowing agents, although the present invention is designed to eliminate the need for the latter technique which tends to require more expensive ingredients. For instance the injection of compressed or even liquified Freon in the extrusion state will, at higher temperatures and lower pressures, result in the release of gases within the second stream of the thermoplastic upon emersion from the extruder. Finely powdered inert particles, preferably with a low affinity to said thermoplastic, might also be used for the same purpose with substantial effect.

Thus, by coextruding on a first or base layer of plastic film a second thermoplastic having a low melt index (or high viscosity), and subjecting the streams to bonding and then stretching them, preferably biaxially, such as for instance by the known air pressure method of expanding plastic tubes, the second thermoplastic (usually the outer layer) being welded and firmly bonded to the film will tend, by virtue of its selected nature, to rupture. This outer layer, by virtue of its low melt index or high viscosity and molecular length, will rupture because it lacks the plasticity, pliability and malleability to stretch as easy as the polyethylene film. If it is additionally weakened by inclusions of particles of air pockets, this will increase its tendency to rupture. Furthermore, because of its high elasticity it will, upon rupture, tend to rebound or snap back into more angular, sharper, higher profile peaks and ridges.

One limitation on the selection of such an outer layer is that the melt index cannot be decreased much below that of the base film when the base film is relatively thin or the second layer will tend to tear the base film in the expansion process (see Table I).

However, by selecting a material for the second layer which, in addition to a low melt index, has a relatively high density (and therefore a higher degree of crystallinity and increased hardness), the tendency for this material to form high sharp hard peaks and ridges is enhanced without adding to its tendency to tear the lower base layer of plastic film.

Thus, not only does the present invention provide a non-slip plastic material which functions in a different manner and in many conditions a more effective manner, but provides a method, including the selection of materials and ingredients, and the control of factors such as melt index and density, for forming this material in a manner which is not only efficient but may eliminate some expensive ingredients such as ethylene-vinyl acetate and foaming agents such as azodicarbonamide as described in the prior art.

The following table of data illustrates the results of tests done on samples of products of the present invention based on standard testing methods approved by the Finnish Board of Labour Protection.

TABLE

|  | Example I | | Example II | | Example III | | Example IV | |
| --- | --- | --- | --- | --- | --- | --- | --- | --- |
|  | Base film | Top structure | Base film | Top structure | Base film | Top structure | Base film | Top structure |
| Melt flow index | 1.2 | 2.0 | 1.2 | 0.7 | 0.7 | 0.8 | 0.3 | 0.14 |
| Density | 0.922 | 0.918 | 0.922 | 0.925 | 0.925 | 0.960 | 0.918 | 0.918 |
| Average base Film thickness | 0.05 mm | | 0.05 mm | | 0.07 mm | | 0.10 mm | |
| Average peak height | | 0.2 mm | | 0.4 mm | | 0.6–0.7 mm | | 0.7–1.0 mm |
| Surface weight of total Film | 60 g/m$^2$ | | 60 g/m$^2$ | | 90 g/m$^2$ | | 130 g/m$^2$ | |
| Coefficion of friction measured with snow | 0.2–0.3 (Dangerous in outdoor conditions | | 0.4–0.45 (Fair) | | 0.5–0.55 (Good) | | 0.6–0.65 (Exellent) | |

This, in general terms, provides a plastic layer having a relatively low strength so as to achieve an appropriate balance between the strength of the top layer and the strength of the bond between the film layers.

If the second layer has a relatively low strength and the bond with the base film layer is strong, the expansion will tend to have the effect of the film stretching the outer layer and causing it to break and tear away from itself because the strength of the bond causes it to remain stuck to the underlying layer.

It should be understood that the nature of the product produced is to be differentiated from that of Sparks, in that the latter provides a tacky foam surface layer on a film whereas the present invention is intended to produce a film on which is scattered at spaced intervals random configurations of Alpine peaks and ridges of sharp high profile, not relying on the layer of tacky material which must contact each other and is relatively ineffective in conditions of ice, snow and water, but rather on hardness and angular profile which produces a rough surface capable of gripping or interlocking with other surfaces.

For further clarification it should be understood that in this disclosure the term "low melt index" is intended to refer to a thermoplastic which has a relatively viscous characteristic in its melted state and is therefore relatively less inclined to stretch easily. The term "low melt strength" is used to indicate a material which is more inclined to rupture when expanded rather than stretch. The term "high density" is used to indicate a thermoplastic which has a close molecular structure, highly crystalline, and therefore tends to be hard in its solid state. The term "elasticity" herein is used to indicate the characteristic of a thermoplastic which will snap back or return to its previous configuration after stretching to the point of rupture.

Thus, as described above, by selecting a material for the second layer which has a low melt index, and giving it a low melt strength by adding inclusions, the tendency to form regular ruptures upon expansion will be enhanced if both layers are strongly bonded to each other inside the die. Furthermore, by selecting a material having a high degree of crystallinity and hardness, the ruptured material which, being elastic, tends to snap back into sharp peaks and ridges and will have an additional quality of hardness, rigidity and sharpness which gives it its non-slip characteristic even where the surface pressure is high.

It will, of course, be appreciated that while we have discussed co-extrusion of a second layer on a plastic film, it is possible that such a layer of texture forming material could be formed on both sides of a base layer of plastic film, thereby comprising three layers with a non-slip surface on each side of the film. Articles of a particular configuration may be manufactured by producing a friction film by a method as described above with the additional steps of heating, vacuum forming and trimming the material to the desired size and shape.

Although the foregoing specification has described specific embodiments of the method and product of the present invention, it should be understood that variations thereof may be employed by those skilled in the art without departing from the scope of the present invention.

What I claim as new and desire to protect by Letters Patent of the United States is as follows:

1. A method of making a film of plastic material with a non-slip surface having a coefficient of friction of at least 0.45 comprising the steps of:
   extruding a first layer of plastic film having a predetermined capability to resist tearing and rupturing upon stretching; and
   simultaneously coextruding therewith a second layer of plastic material having a predetermined lesser capability to resist rupture on stretching than said first layer; and
   coextruding said second layer so that said second layer is bonded, at least at a multiplicity of spots, to said first layer;
   expanding and coextruded layers after extrusion so as to cause the rupture of said second layer into a random pattern of high, hard, sharp peaks and ridges;
   said second layer being formed of a high elasticity thermoplastic material having a melt flow index in the plastic-elastic state at least as low as 1.0, and having a high density in the range of 0.920 to 0.960.

2. A method of making a film of plastic material with a non-slip surface having a co-efficient of friction of at least 0.50 comprising the steps as defined in claim 1 in which said second layer has a melt flow index in the plastic-elastic state at least as low as 0.3, and having a high density in the range of 0.920 to 0.960.

3. A method of making a film of plastic material with a non-slip surface having a co-efficient of friction of at least as high as 0.60 comprising the steps of claim 1 in which said second layer has a melt flow index in the plastic-elastic state at least as low as 0.14, and having a high density in the range of 0.920 to 0.960.

4. A method as claimed in claim 1 in which the capability of said second layer to resist rupture is reduced by impregnating the said second layer with inclusions prior to expanding same.

5. A method as claimed in claim 2 in which the capability of said second layer to resist rupture is reduced by impregnating the said second layer with inclusions prior to expanding same.

6. A method as claimed in claim 3 in which the capability of said second layer to resist rupture is reduced by impregnating the said second layer with inclusions prior to expanding same.

7. A method as claimed in claim 4 in which said inclusions are powdered particles.

8. A method as claimed in claim 5 in which said inclusions are powdered particles.

9. A method as claimed in claim 6 in which said inclusions are powdered particles.

10. A method as claimed in claim 4 in which said inclusions are gas bubbles.

11. A method as claimed in claim 5 in which said inclusions are gas bubbles.

12. A method as claimed in claim 6 in which said inclusions are gas bubbles.

13. A method as claimed in claim 10 in which said bubbles are formed by mixing compressed or condensed freon in said second layer prior to extrusion.

14. A method as claimed in claim 11 in which said bubbles are formed by mixing compressed or condensed freon in said second layer prior to extrusion.

15. A method as claimed in claim 12 in which said bubbles are formed by mixing compressed or condensed freon in said second layer prior to extrusion.

16. A method as claimed in claim 1 in which said first layer of plastic film and said second layer are caused to bond together by being coextruded through two channels of a die, which channels merge at a point upstream from the outlet of the orifice of said die.

17. A method as claimed in claim 2 in which said first layer of plastic film and said second layer are caused to bond together by being coextruded through two channels of a die, which channels merge at a point upstream from the outlet of the orifice of said die.

18. A method as claimed in claim 3 in which said first layer of plastic film and said second layer are caused to bond together by being coextruded through two channels of a die, which channels merge at a point upstream from the outlet of the orifice of said die.

19. A method as claimed in claim 1 comprising the additional steps of heating the non-slip plastic film, followed by vacuum forming and trimming to the desired shape.

* * * * *